Figure 1:
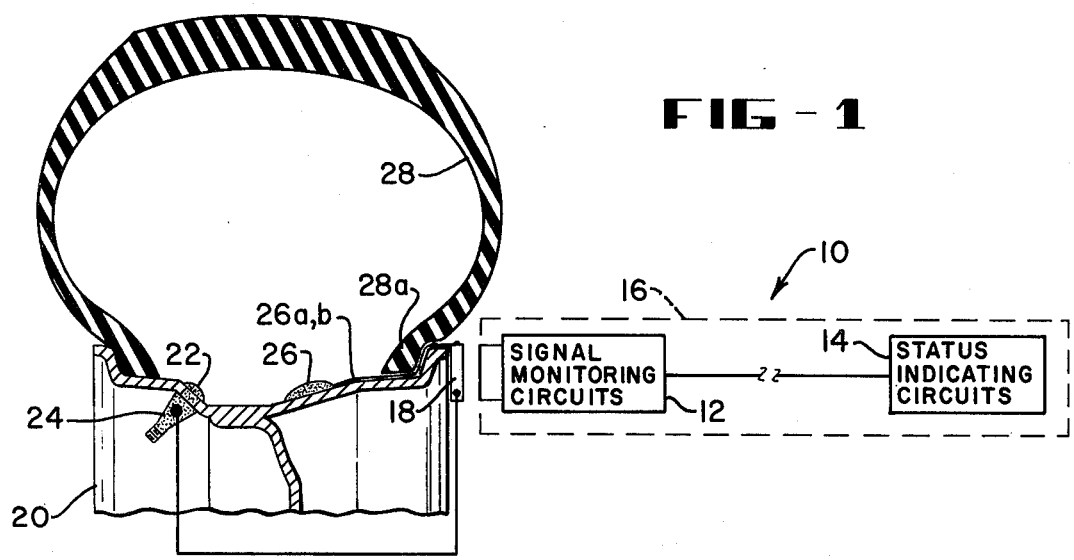

United States Patent [19]

Enabnit

[11] 4,052,696
[45] Oct. 4, 1977

[54] TIRE CONDITION MONITOR

[75] Inventor: Robert S. Enabnit, Akron, Ohio

[73] Assignee: The Goodyear Tire & Rubber Company, Akron, Ohio

[21] Appl. No.: 662,763

[22] Filed: Mar. 1, 1976

[51] Int. Cl.² .............................................. B60C 23/02
[52] U.S. Cl. ..................................... 340/58; 340/57; 200/61.22; 73/146.5
[58] Field of Search ................ 340/57, 58; 200/61.22, 200/61.25, 61.4; 73/146.3, 146.4, 146.5

[56] References Cited
U.S. PATENT DOCUMENTS

| | | | |
|---|---|---|---|
| 3,374,460 | 3/1968 | Massoubre | 340/58 |
| 3,662,335 | 5/1972 | Fritze | 340/58 |
| 3,852,717 | 12/1974 | Hosaka et al. | 340/58 |
| 3,975,706 | 8/1976 | Kato | 340/52 A |

Primary Examiner—John W. Caldwell
Assistant Examiner—Joseph E. Nowicki
Attorney, Agent, or Firm—F. W. Brunner; L. A. Germain

[57] ABSTRACT

A tire condition sensing circuit includes a ferrite element that changes from a ferromagnetic to a nonferromagnetic state in response to a temperature increase above the material Curie point. The change in state of the element affects the sensor circuit operation such that a normal inductive coupling effect is altered and an abnormal tire condition indicated.

5 Claims, 2 Drawing Figures

TIRE CONDITION MONITOR

BACKGROUND OF THE INVENTION

This invention pertains to vehicle tire condition monitoring systems and more specifically to a unique sensor circuit configuration adapted to being carried on a vehicle wheel for sensing a change associated with an abnormal tire condition.

In a prior U.S. Pat. No. 3,665,387 issued May 23, 1972, to Robert S. Enabnit, there is described a signalling system for a low tire condition which incorporates a wheel sensor circuit comprising a close-circuited inductor in an inverse coil configuration for reversing the magnetic field coupling that exists between a pair of inductive coils associated with an oscillator-detector on the vehicle chassis. The close-circuited condition of the sensor circuit inductor at normal pressure periodically affects the coupling field of the oscillator coils such that a modulation pulse signal is generated and the change in condition is recognized when the modulation pulse is not present by reason of an open-circuited sensor circuit.

In a second U.S. Pat. No. 3,831,161 issued Aug. 20, 1974, to Robert S. Enabnit, an amplifier is caused to momentarily oscillate by reason of the periodic field coupling effected between input and output amplifier inductors and a close-circuited sensor circuit inductor on the vehicle wheel. The positive feedback coupling effected by the sensor circuit inductor generates a modulation pulse signal and again the change in condition is recognized when the modulation pulse is absent by reason of an open-circuited sensor circuit.

While the apparatus of these prior art patents may be adapted to sensing a change in either a pressure or a temperature condition by reason of a switch responsive to the particular condition, they do not provide for sensing changes in both pressure and temperature, either or both of which may be due to an abnormal condition occurrence.

Thus, it is an object of this invention to provide a novel sensor circuit configuration adapted for sensing the occurrence of a change in temperature associated with an abnormal tire condition.

It is another object to provide a failsafe sensor circuit configuration that is independently responsive to both pressure and temperature changes.

These objects are accomplished in a sensor circuit configuration comprising:

a. an inductive circuit for establishing a coupling field indicative of a normal tire condition; and b. a temperature responsive element that exhibits a change-of-state physical characteristic in response to a temperature change above a predetermined threshold, said element coupled into the inductive circuit to maintain the coupling field indicative of a normal condition when its characteristic is indicative of a temperature below the threshold but to affect the coupling field when it changes state in response to a temperature above the threshold, said affect on the coupling field being indicative of an abnormal tire condition.

IN THE DRAWINGS

Figure 2:
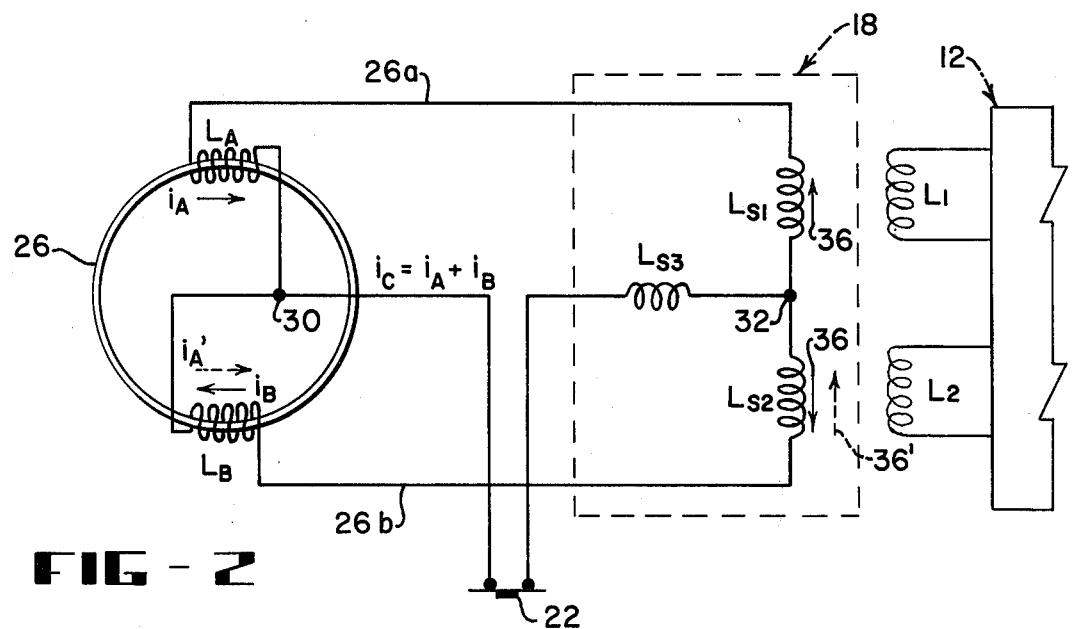

FIG. 1 is a combined schematic-pictorial illustration showing a low tire pressure warning system adapted to monitoring an abnormal tire condition according to the teaching of this invention; and FIG. 2 is a schematic circuit diagram of the sensor circuit according to this invention.

DESCRIPTION OF THE INVENTION

Referring to FIG. 1, a tire condition monitoring system is generally indicated by numeral 10 which comprises signal monitoring circuitry 12 and status indicating circuitry 14 mounted on a vehicle chassis 16, and a condition responsive sensing circuit 18 mounted on a vehicle wheel 20. The signal monitoring circuits 12 may be of the type described in either of the prior U.S. patents referenced above, or any equivalents thereof that are responsive to electromagnetic fields that exist or which may be generated between the sensor circuit 18 and the signal monitoring circuit 12. Likewise, the status indicating circuit 14 may take on many and various forms well known and understood by persons knowledgeable in the art.

The condition responsive sensor circuit 18 conventionally includes a pressure switch 22 mounted on or incorporated into the valve stem 24, which switch affects the operative state of the sensor circuit 18 by virtue of its open-circuited or close-circuited condition. According to this invention a temperature responsive device 26 is mounted on the inside surface of the wheel rim 20 to detect a change in temperature that may be associated with an abnormal condition of a tire 28. The device may be secured in position by any means compatible with it and the tire mounting; however, for the purpose of this description it is shown being secured by the tire head 28a. In this case, the lead wires 26a,b interconnecting the device 26 and the sensor 18 may be flat ribbon-like conductors that will not interfere with the bead seating on the rim. The device 26 may also be mounted through a hole in the rim in the manner of the tubeless tire valve stem 24; however, the mounting shown works as well and requires no changes to the rim.

FIG. 2 more specifically illustrates the invention as it is applied to an inductive type sensor circuit 18. In this application the sensor circuit comprises a pair of inductive coils $L_{s1}$ and $L_{s2}$ that are coupled in an inverse or reverse figure-eight configuration such as to effect coupling reversal of the field that exists between a second pair of inductive coils $L_1$ and $L_2$ associated with an oscillator-detector in the monitoring circuit 12. The coils $L_{s1}, L_{s2}$ are normally in a closecircuited condition by reason of the closed pressure switch 22 and therefore affect the monitoring circuit each revolution of the wheel 20 or when the $L_{s1}, L_{s2}$ coils are in proximate position to affect the existing coupling field between coils $L_1, L_2$.

Introduced into the sensor circuit is an alterable ferrite element in the form of a toroid 26 that exhibits a tendency to change its properties from ferromagnetic to nonferromagnetic by virtue of a temperature change in the material comprising this toroidal core. The Curie point is that temperature which marks the transition between ferromagnetic and nonferromagnetic properties of the material and it is this characteristic that is utilized in the instant invention to provide a unique but simple tire temperature sensing device. Curie point ferromagnetic materials of the type described are manufactured by the Edo Corporation, College Point, N.Y.

The toroid 26 is coupled into the sensor circuit 18 by a pair of inductive coils $L_A$ and $L_B$ wound on opposite halves of the toroid. Inductor $L_A$ is connected in series with $L_{S1}$ via line 26a while inductor $L_B$ is connected in series with $L_{S2}$ via line 26b. Both series circuits $L_A,L_{s1}$ and $L_B,L_{S2}$ are interconnected via switch 22 and a third inductive coil $L_{s3}$ to form parallel branch circuits respectively. The node connections are indicated at 30 and 32.

In operation, the toroid 26 is ferromagnetic at a temperature below a predetermined Curie point value as established for the material in its manufacture. In this condition, current flowing in the circuit comprising $L_{S1}$, $L_A$ will have a direction indicated for $i_A$ which will induce a current in $L_B$ having a direction indicated by $i_B$. The resultant common current flowing between nodes 30 and 32 is indicated by $i_C = i_A + i_B$. As long as the toroid remains ferromagnetic, currents induced in the sensor circuit inductances $L_{S1}$, $L_{S2}$ by reason of the coupling field existing between $L_1$, $L_2$ will exhibit a direction indicated by arrows 36 such that coupling reversal is effected between $L_1,L_2$. The signal monitoring circuit 12 is therefore periodically affected when the vehicle wheel rotates such that a modulation signal is generated. The condition indicator 14 subsequently responds to the modulation signal for a normal condition indication.

Alternately, when the toroid material changes to exhibit nonferromagnetic properties as a result of an increase in temperature above the Curie point threshold, current is no longer induced in $L_B$ in the direction $i_B$ by virtue of the high electromagnetic coupling of the toroidal core, and the current now flowing through $L_B$ is the series current of $L_{S1}$, $L_A$, $L_B$, and $L_{S2}$ and has the direction indicated by $i_A'$. With substantially all current flowing in this loop, nodes 30 and 32 are essentially equipotential and very little current flows between them. The current in $L_{S2}$ is thus reversed as indicated by arrow 36' operating to cancel any coupling reversal that was previously effected between $L_1,L_2$. Since the status indicating circuit 14 provides a normal condition indicating only in the presence of a modulation signal effected by coupling reversal between $L_1,L_2$, the absence of a modulation signal reverts to an abnormal condition indication.

In the circumstance when switch 2 is opencircuited by a loss in tire pressure, there is no common return path for $i_A + i_B$ and current flowing in $L_A$ is opposed by current in $L_B$ such that the entire circuit reflects a high impedance and very little current flows even if the toroidal core is ferromagnetic. The result is that either a loss of core properties due to temperature or an open switch 22 due to a pressure loss will not provide the inverse current in $L_B$ required to effect the coupling reversal of $L_1$ and $L_2$ and provide the desired modulating signal. $L_3$ is provided to prevent $L_A$ from acting as a low impedance to $L_{S1}$ when switch 22 is closed and the core is ferromagnetic, and to prevent excessive loading of $L_1$.

While certain representative embodiments and details have been shown for the purpose of illustrating the invention, it will be apparent to those skilled in the art that various changes and modifications may be made therein without departing from the spirit or scope of the invention.

I claim:

1. A condition sensing circuit adapted for mounting on a vehicle wheel to monitor the condition of a tire and provide an indication of a change in condition through inductive coupling with signal monitoring and indicating apparatus mounted on the vehicle chassis, the sensor circuit comprising:
   A. a toroidal ferrite element that switches from a ferromagnetic state to a nonferromagnetic state when the element temperature exceeds the Curie point established for the ferrite material;
   B. an inductive circuit for establishing a particular inductive coupling effect indicative of a normal tire condition when in proximate position to the signal monitoring apparatus; and
   C. means to couple the ferrite element into the inductive circuit comprising a pair of inductive coils wound on opposite halves of the toroid element and forming parallel branch circuits such that current flow in one of the branches is reversed when the element switches to a nonferromagnetic state due to a temperature above the Curie point, said current reversal effectively altering the particular inductive coupling effect for an abnormal tire condition indication.

2. The condition sensing circuit as set forth in claim 1 wherein a pressure sensing switch is connected into the means coupling the ferrite element into the inductive circuit such that either an open-circuited pressure switch or a nonferromagnetic element alters the inductive coupling effect indicative of a normal tire condition.

3. In a vehicle tire condition monitoring system including chassis mounted signal monitoring and indicating circuits, the monitoring circuit responsive to a magnetic field reversing effect to provide a modulation signal to the indicator circuit indicative of a normal tire condition, a wheel mounted condition sensing circuit comprising:
   A. a toroidal ferrite element exhibiting a change-of-state characteristic from a ferromagnetic to a nonferromagnetic in response to a temperature above the ferrite material Curie point;
   B. a first branch circuit comprising a first pair of series connected inductive coils, one of the pair being wound on a first half portion of the toroid while the other of the pair is mounted to affect the monitoring circuit when positioned relative thereto;
   C. a second branch circuit comprising a second pair of series connected inductive coils, one of the pair being wound on a second half portion of the toroid while the other of the pair is mounted to affect the monitoring circuit when positioned relative thereto;
   D. a coupling circuit interconnecting the branch circuits by a pair of node connections, the first of the nodes interconnecting the inductive coils that are wound on separate halve portions of the toroid while the second of the nodes interconnects the inductive coils that are positioned relative to the monitoring circuit, said coils being effective to provide a reverse magnetic field coupling effect when the ferrite element is in its ferromagnetic state but are ineffective to provide such reverse coupling effect when the ferrite element is in a nonferromagnetic state, said ineffectiveness establishing an abnormal temperature condition indication by reason of the absence of a modulation signal being generated in the monitoring circuit.

4. The tire condition monitoring system as set forth in claim 3 wherein the coupling circuit includes a switch in a normally close-circuited condition such that either an open-circuited switch or a nonferromagnetic ferrite element establish an ineffective reverse coupling affect and an abnormal tire condition is recognized.

5. The tire condition monitoring system as set forth in claim 4 wherein the coupling circuit further includes an inductor connected in series with the switch to prevent excessive loading of the signal monitoring circuit when the switch is closed and the ferrite element is in its ferromagnetic state.

* * * * *